Nov. 3, 1953

O. RUTHNER 2,657,989

SEPARATION OF METALS IN POWDER FORM
FROM THEIR SALT SOLUTIONS
Filed Aug. 17, 1950

*Inventor*
OTHMAR RUTHNER
By *Richard [signature]*
*Agent*

Patented Nov. 3, 1953

2,657,989

UNITED STATES PATENT OFFICE 2,657,989

SEPARATION OF METALS IN POWDER FORM FROM THEIR SALT SOLUTIONS

Othmar Ruthner, Vienna, Austria

Application August 17, 1950, Serial No. 179,909

1 Claim. (Cl. 75—69)

This invention relates to a method of separating metals in powder form from solutions of their salts, the present application being a continuation-in-part of my application Ser. No. 68,385, filed December 30, 1948, now abandoned.

The primary object of my invention is to generally improve the separation of metals in powder form from metal salt solutions.

Another object of my invention is to carry out such separations by means of sodium amalgam.

A further object is to carry out the separations referred to to obtain metals in powder form under simultaneous formation of sodium salts.

Still further objects center about a simple apparatus and are to provide the separation of metals in powder form in a continuous process.

It is known that metals with a more positive oxidation potential will in general have the property of displacing less positive metals from solutions of their ions. Sodium would be particularly well suited for such precipitation reactions because of its high position in the electromotive series and its consequent capability to displace almost all metals from solutions of their ions, especially if used in the form of its amalgam. Due to the dilution of sodium with mercury, the reaction occurs at a slower rate and can, therefore, more readily be controlled.

Although it would thus appear that sodium amalgam should play an important role in the extraction of metals, this has not been the case so far. Laboratory experiments proved that most heavy metals can be precipitated from solutions of their salts by sodium amalgam, but this method has not found any practical commercial application as yet. This is apparently due to secondary reactions which occur almost simultaneously with the metal precipitation.

Sodium is well known to react vehemently with water under formation of sodium hydroxide and hydrogen. Thus, if aqueous metal salt solutions are brought in contact with sodium amalgam, the precipitation of metals is accompanied by the formation of sodium hydroxide which in turn either redissolves freshly precipitated and finely divided metal particles, which are highly reactive, or converts them into insoluble hydroxides.

If, for example, a layer of manganese chloride or manganese sulfate solution is placed over a layer of sodium amalgam, it will be noted that a black powdery precipitate of manganese metal is formed at the interface at the first moment which, however, is converted into manganese hydroxide within a few seconds.

A similar reaction takes place if the solution of an iron salt solution is used instead of a manganese salt solution.

Simultaneously with this redissolution or conversion of the precipitated metal powder, another secondary reaction occurs. The sodium hydroxide formed also reacts with the original salt solution and precipitates the metal present as insoluble hydroxide, thus preventing further metal precipitation.

Attempts to provide intimate contact between the metal salt solution and the sodium amalgam by agitating, kneading, centrifuging or other mechanical methods, rather than by superimposing the salt solution, or allowing the salt solution to flow, over a layer of the amalgam, were not successful. In carrying out any such turbulent mixing method, individual particles of sodium amalgam soon become covered with a film of insoluble metal hydroxide and the final product will be a foamy pulp consisting of mercury drops, insoluble hydroxides, hydrogen, air and metal salt solution, but no metal will be formed in recoverable amounts.

An important and more specific object of my invention is to overcome these difficulties and to obtain metal powders of highest purity, under simultaneous formation of sodium salts, in an economical way.

To the accomplishment of the foregoing and other objects which will hereinafter appear, my invention consists in the method steps and apparatus elements and their relation one to the other, as hereinafter are more particularly described in the specification and sought to be defined in the claim.

According to the invention, highly concentrated solutions of salts of metals which are nobler than sodium are introduced into sodium amalgam under pressure. The solution thereby disperses into small drops and droplets which, due to their buoyancy, rise in the sodium amalgam.

While rising, each droplet of solution is constantly surrounded by sodium amalgam, thus coming into contact and reacting with ever new particles of sodium.

Within the droplet metal is precipitated in finest powder form. I have found that these metal particles enter the surrounding mercury and are held there either mechanically, as is the case, for instance, with iron and cobalt, or form an amalgam with the mercury as, for instance, in the case of manganese and tin. They are thus protected against the action of any sodium hydroxide which may have formed in the droplet.

The sodium salt solution, which forms within each droplet from the sodium and anion of the original metal salt solution by the precipitation of the metal, rises to the surface of the mercury, and any sodium hydroxide formed, due to its being separated from the original metal salt solution by the sodium amalgam, cannot react with the metal salt. The extremely detrimental formation of insoluble hydroxides is thus avoided.

According to an important feature of my invention, the mercurial phase is given the shape of a columnar body by being held in a tubular vessel in vertical or inclined position, whereby the inclination may make any angle with the horizontal plane. The tubular vessel may also have the form of a helix. According to another feature of my invention, sodium amalgam and the metal salt solution are introduced at the lower end of the tube, and the reaction products, namely mercury, metal and sodium salt solution, are withdrawn from the upper tube end. In carrying out the precipitation in this way, my method is a continuous one.

I prefer to introduce the sodium amalgam at the end of the tube, and the metal salt solution near the end of the tube.

Thus, sodium amalgam and metal salt solution flow in the same direction. The fresh metal salt solution which enters at the bottom of the vessel has its highest metal concentration when entering the amalgam, and gradually loses its metal content while rising. Similarly, the amalgam has its highest sodium content when entering at the bottom, and its lowest content, or is even free of sodium, when leaving at the top of the vessel.

By regulating the rising speeds of the sodium amalgam and metal salt solution relative to each other in an amalgam column of an appropriate height, the process can be controlled so that the mercury and aqueous solution leaving at the top will be free of sodium and metal ions, respectively. The metal will be quantitatively precipitated within the mercurial phase. Since no free sodium reaches the top of the column, no sodium hydroxide is formed in the supernatant liquid.

There is a group of metals including antimony and arsenic which when precipitated with the aid of sodium amalgam will neither form a mechanical mixture nor an amalgam. Such metals are precipitated in form of an extremely fine powder which rises in the mercury and accumulates, together with the sodium salt solution, above the surface of the mercury. The metals of this group are only slowly soluble in sodium hydroxide. It is, therefore, possible to avoid losses of metal by rapidly separating the metal powders from the sodium salt solution and by conducting the process so that the mercury is practically free of sodium when reaching the top of the column. Accordingly, the process of my invention can even be applied to the metals of this group.

As indicated above, concentrated metal salt solutions, preferably solutions of the highest possible concentration, have to be used to suppress as much as possible the formation of sodium hydroxide. However, the use of high concentrations is qualified by the tendency of the solutions to crystallize at small changes in temperature and then to clog pipe lines and other passages. If it becomes necessary to reduce the concentration of the metal salt solution, disadvantages caused by such a reduction may be met by using sodium amalgam of a lower sodium content than used with a highly concentrated metal salt solution.

Generally, I use sodium amalgam containing as much sodium as is compatible with good fluidity, i. e., up to about 0.3%. With such concentration, precipitation reactions are at their highest rate of speed. If the sodium concentration is reduced, e. g., to about 0.3%, the rate of reaction is also reduced, and the occurrence of secondary reactions is retarded at the same time. The concentration of sodium in mercury may be reduced to as low as approximately 0.02%.

It is, therefore, possible to eliminate undesirable side reactions to such an extent that they will not interfere with the precipitation of metal by following one or several of the following schemes: (1) Control of the relative rising velocity of amalgam and metal salt solution in the column, (2) changes in the height of the amalgam column, (3) use of highly concentrated solutions, (4) adjustment of the sodium concentration in the amalgam to the metal concentration in the solution.

After completion of the reaction, the reaction products are separated by any number of known simple methods.

When extracting metals which separate in powder form on the top surface of the amalgam column, such as antimony and arsenic, the aqueous sodium salt solution in which the metal powder is suspended is decanted from the mercury, and the metal powder is then separated from the solution by filtration In producing metals which form amalgams, such as manganese and tin, the sodium salt solution is decanted from the amalgam and the metal is obtained as a powder after evaporation of the mercury.

The same procedure is used when dealing with metals which do not form amalgams but remain mechanically bound to the mercury, such as iron and cobalt. In this case a major portion of the mercury can be reclaimed by filtration prior to evaporation.

Mercury which after the metal precipitation is low in sodium or free from it may be returned to an electrolytic sodium cell where it is again converted into sodium amalgam of desired concentration.

The following examples are given to illustrate my invention without limiting however, its scope.

EXAMPLE 1

*Production of metallic antimony from antimonite (stibnite, $Sb_2S_3$)*

Finely powdered antimonite, $Sb_2S_3$ (concentrate), is dissolved in a concentrated solution of sodium sulfide, $Na_2S$, according to the following equation:

$Sb_2S_3 + 3Na_2S = 2Na_3SbS_3$
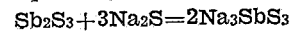
(sodium thioantimonite)

The solution is separated from the undissolved gangue by decanting and filtering and is introduced from the bottom into an upright reaction tube of 20 mm. I. D. and a height of 700 mm., which is filled with sodium amalgam of 0.2%–0.5% sodium content, at room temperature and at a pressure of about 16 pounds per square inch. The solution rises in the mercury column, while antimony precipitates as an extremely fine powder. At the same time a concentrated solution of $Na_2S$ is formed according to the equation:

$2Na_3SbS_3 + 6Na = 2Sb + 6Na_2S$

The sodium sulfide solution in which the antimony powder is suspended accumulates on the top surface of the mercury column. The antimony powder is separated from the sodium sulfide solution by filtration. One half of the sodium sulfide solution obtained will be used for dissolving an equal amount of antimonite concentrate, whereas the other half will be available for sale. The antimony powder is washed and dried and can either be sold as such, or it is compressed and the compacts are melted to "star" antimony by known methods.

Antimony produced in accordance with my method can be obtained 99.6% pure or better. The yield is above 95% of the theoretical value. The mercury now free of solution and antimony and which contains little or no sodium is made the cathode in a sodium chloride cell and is there enriched with sodium by known processes. It is then recycled to the process of the invention. Antimony may be produced in a continuous process by continuously introducing fresh sodium amalgam into the reaction tube while at the same time injecting sodium thioantimonite solution under pressure.

The process as described in this example offers important advantages in the production of antimony over all known processes of roasting, oxydizing and reducing antimony ores. There are no losses of antimony due to evaporation, dusting and oxydation. The whole process takes place at temperatures below 100° C. The sulfur contained in the ore is recovered in the form of the valuable salt $Na_2S$, whereas it was usually lost in the prior processes. Except for the electric current used in the production of sodium amalgam, no electric current or any other form of energy is required to any substantial extent to produce the metal powder and the sodium sulfide solution.

The pressure under which the sodium thioantimonite is introduced in the reaction tube has, of course, to overcome the pressure of the sodium amalgam therein. If the height of the amalgam body exceeds 700 mm., a pressure of correspondingly more than 16 pounds per square inch is required.

EXAMPLE 2

*Production of iron powder from iron sulfate*

Iron sulfate, $FeSO_4.7H_2O$, is a compound which is obtained is large quantities as a by-product of the pickling process in the steel industry and in the manufacture of titanium oxide, $TiO_2$, from ilmenite. So far, no use has been found for it. Instead, it has to be removed at a substantial cost to render it harmless. A concentrated solution of $FeSO_4.7H_2O$ is pressed through a sodium amalgam column in the same way as shown in Example 1. The following reaction occurs:

$$FeSO_4 + 2Na = Fe + Na_2SO_4$$

Iron precipitates in form of a fine powder, and at the same time a concentrated solution of sodium sulfate is formed which rises to the surface of the mercury where it accumulates and can be separated by decantation.

The iron powder precipitate first forms a mechanical mixture with the mercury. The mercury is subjected to filtration under vacuum whereby about 90% of the mercury are reclaimed free of iron, whereas the remaining mercury contains all the iron powder. This fraction of the mercury is now subjected to distillation, whereby the rest of the mercury is reclaimed as the distillate and the iron powder remains in the retort. This peculiar property of iron powder is of great advantage. If the iron powder would separate from the mercury, as does the antimony powder, and if it would rise together with the sodium sulfate solution, it would become oxidized to iron hydroxide.

The iron powder obtained according to my invention is very pure and comparable to the so-called electrolytic iron powder. It can be used for the manufacture of powder metal parts by press forming and subsequent sintering. The sodium sulfate formed may be either sold as such or it may be used to manufacture sodium chloride and dilute sulfuric acid by a known process.

The sulfuric acid may be returned to the pickle vats or used for the solution of ilmenite, whereas the sodium chloride may be employed for the production of new sodium amalgam. A complete production cycle is thus formed which yields only iron powder.

EXAMPLE 3

*Production of manganese metal from its compounds*

Manganese chloride, $MnCl_2$, which is obtained by chlorination of manganese slags or manganese ores, is introduced in form of a concentrated solution into a sodium amalgam column at its bottom, elevated pressure being used thereby. Manganese metal is precipitated according to the following equation:

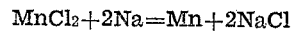

$$MnCl_2 + 2Na = Mn + 2NaCl$$

The manganese forms an amalgam with the mercury. Simultaneously a solution of NaCl is formed which rises to the surface of the mercury and is separated by decantation.

This solution may be used to form new sodium amalgam by known electrolytic methods, whereas the chlorine obtained at the same time may be used to chlorinate new amounts of manganese slags or manganese ore. The crystals of manganese amalgam are separated from the bulk of the mercury by filtration, and the manganese metal is separated from the mercury by distillation. This process offers the possibility of producing manganese of highest purity at reasonable cost from manganese-bearing slags as well as lean manganese ores which are available in immense quantities.

If mercury is used for the production of amalgam, as described in the examples above, the reclaimed mercury may become enriched with other metals present in the ore which form amalgams and which may be extracted by distilling the mercury from time to time. This may be of importance if noble metals are present.

The process may be carried out by means of typical apparatus such as shown in the accompanying drawing.

Fig. 1 is a diagrammatic view of the apparatus showing the treatment of compounds of metals which do not form an amalgam nor don't remain mechanically combined with the mercury for instance Sb and As.

Figure 1:
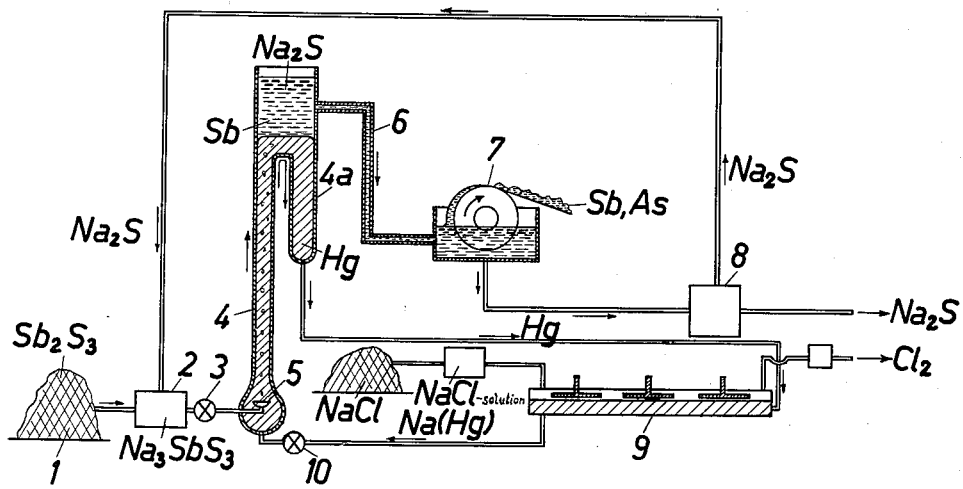

In Fig. 1 the starting compound for instance antimony ore ($Sb_2S_3$) is transported from the stock 1 into the vessel 2 where it is leached by addition of $Na_2S$ and a solution of $Na_3SbS_3$ is formed. This solution after being decanted from the insoluble (the gangue) is pressed by the pump 3 into the precipitating apparatus 4 by a jet 5. The precipitating apparatus which has the form as shown in the design is filled by the pump 10 with sodium-amalgam. The solution rises in small drops within the sodium-amalgam column to the top and during its rise the metal is precipitated in finest powder form and leaves the mercury together with the simultaneously formed $Na_2S$ solution and piles up on the surface of the amalgam column. The amalgam now practically free from sodium and free from metal flows into the second part 4a of the U-shaped reaction-vessel and is conducted into the chlorine-alkali electrolysis plant 9 where it is charged again with sodium and the sodium-amalgam formed is reconducted by the pump 10 into the reaction-vessel 4. The $Na_2S$ solution in which the Sb powder is in suspension is conducted by a tube 6 into a drum-filter 7 in which it is separated from the Sb powder by filtration. The Sb powder is then washed, dried and molten. The $Na_2S$ solution is conducted into a vessel 8 from which half of the formed solution is reconducted to vessel 2 to bring another quantity of $Sb_2S_3$ in solution whereas the other half is concentrated into solid form for sale.

Figure 2:
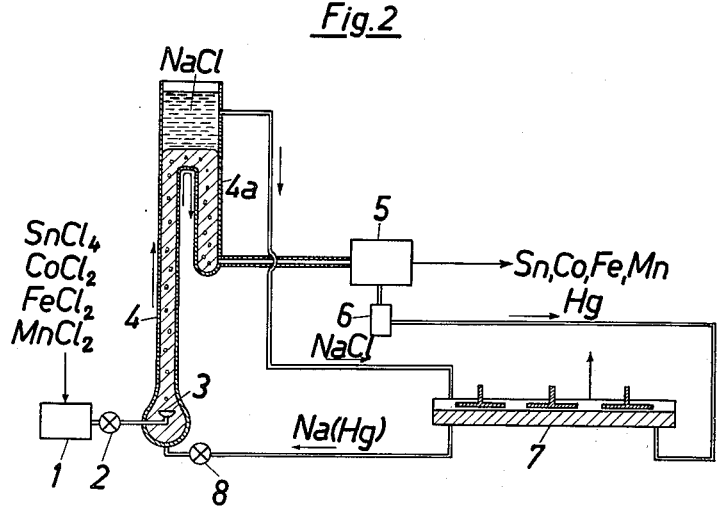
Fig. 2 is a diagrammatic view of the apparatus for the treatment of compounds of metals which are forming amalgams for instance Mn or Sn, and of metals which remain mechanically combined with the mercury for instance Fe or Co.

Vessel 1 in Fig. 2 contains the solution of the starting compound for instance $FeCl_2$ which is pressed by the pump 2 though a jet 3 into the reaction-apparatus 4 which is constantly filled by the pump 8 with sodium-amalgam. The solution rises in small drops within the sodium-amalgam column and during its rise the metal is precipitated in finest powder form which remains mechanically combined with the mercury whereas the simultaneously formed NaCl solution piles on the surface of the mercury. The mercury now practically free from sodium and containing the iron powder flows into the second part 4a of the reaction apparatus and from there into a retort 5 in which the mercury is distilled the iron powder remaining in the retort. The mercury vapour is cooled in a cooling chamber 6 and the fluid mercury conducted into the chlorine-alkali electrolysis plant 7. The solution of NaCl formed simultaneously with the precipitation of the iron powder which piles on the surface of the mercury in the reaction-vessel is conducted into the same chlorine-alkali electrolysis plant and supplies the sodium necessary for the formation of sodium-amalgam.

It is to be understood that my invention is susceptible of many modifications within the scope thereof, and it is, therefore, my desire to include these within the terms and spirit of the appended claim.

I claim:

Method of recovering from ores a metal selected from the group consisting of antimony and arsenic, and sulfur, contained in the ore used, in the form of sodium sulfide, comprising dissolving the ore in a boiling solution of sodium sulfide, pressing the sulfur-alkaline solution obtained through sodium amalgam, allowing the metal to precipitate and sodium sulfide to form, and treating new ore with the sodium sulfide formed.

OTHMAR RUTHNER.

References Cited in the file of this patent

UNITED STATES PATENTS

| Number | Name | Date |
|---|---|---|
| 689,926 | Smart | Dec. 31, 1901 |
| 736,036 | Sulman et al. | Aug. 11, 1903 |
| 2,082,362 | Stevens | June 1, 1937 |
| 2,239,144 | Dean et al. | Apr. 22, 1941 |

OTHER REFERENCES

Chemical Abstracts, vol. 21, 1927, page 1418.

Comprehensive Treatise on Inorganic and Theoretical Chemistry, vol. 4, page 1019. Edited by Mellor. Published in 1923 by Longmans, Green, and Co., London, England.